US012791905B2

(12) United States Patent
Bergman et al.

(10) Patent No.: US 12,791,905 B2
(45) Date of Patent: Nov. 10, 2026

(54) SILICON PHOTONIC BAND INTERLEAVER

(71) Applicant: THE TRUSTEES OF COLUMBIA UNIVERSITY IN THE CITY OF NEW YORK, New York, NY (US)

(72) Inventors: Keren Bergman, New York, NY (US); Asher Novick, Long Island City, NY (US); Anthony Rizzo, New Hartford, NY (US); Songli Wang, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 294 days.

(21) Appl. No.: 18/625,875

(22) Filed: Apr. 3, 2024

(65) Prior Publication Data

US 2024/0329490 A1 Oct. 3, 2024

Related U.S. Application Data

(60) Provisional application No. 63/456,646, filed on Apr. 3, 2023.

(51) Int. Cl.

| | |
|---|---|
| ***G02F 1/21*** | (2006.01) |
| ***G02F 1/01*** | (2006.01) |
| ***G02F 1/225*** | (2006.01) |

(52) U.S. Cl.

CPC ............ *G02F 1/217* (2021.01); *G02F 1/0147* (2013.01); *G02F 1/212* (2021.01); *G02F 1/225* (2013.01)

(58) Field of Classification Search

None

See application file for complete search history.

(56) References Cited

U.S. PATENT DOCUMENTS

| | | | | |
|---|---|---|---|---|
| 7,519,246 | B2 | 4/2009 | Welch et al. | |
| 7,941,014 | B1 * | 5/2011 | Watts .................. | G02B 6/1223 385/32 |
| 10,651,820 | B2 | 5/2020 | Kippenberg et al. | |
| 10,686,562 | B2 | 6/2020 | Xiao et al. | |
| 10,862,610 | B1 | 12/2020 | Schubert et al. | |
| 2003/0174946 | A1 | 9/2003 | Viens | |
| 2015/0261058 | A1 * | 9/2015 | Silverstone ............ | H04B 10/70 977/950 |

OTHER PUBLICATIONS

Luo et al., "High bandwidth on-chip silicon photonic interleaver," Optics Express 18(22):23079-23087 (2010) (Year: 2010).*

Novick et al., "Tunable and Compact SiP Quasi-Dichroic Filter with ≥10 dB/nm Roll-Off Across C- & L-bands," 2022, 2 pgs (Year: 2022).*

(Continued)

*Primary Examiner* — Chad H Smith

(74) *Attorney, Agent, or Firm* — Baker Botts L.L.P.

(57) ABSTRACT

The disclosed subject matter provides systems and methods for band-interleaving. An example system can include a tunable band interleaver based on a ring-assisted Mach-Zehnder interferometer (RAMZI). The RAMZI can include a predetermined number of an assist rings.

22 Claims, 8 Drawing Sheets

(56) References Cited

OTHER PUBLICATIONS

Jiang et al., "Compact CWDM interleaver based on an interfering loop containing a one-dimensional Fabry-Perot cavity," Optics Letters 43(5):1071-1074 (2018).
Jiang et al., "Compact Silicon Photonic Interleaver Using Loop-Mirror-Based Michelson-Gires-Tournois Interferometer," Optical Fiber Communication Conference, Mar. 2016, 3 pgs.
Lai et al., "Compact silicon photonic interleaver based on a self-coupled optical waveguide," Applied Optics 55(27):7550-7555 (2016).
Luo et al., "High bandwidth on-chip silicon photonic interleaver," Optics Express 18(22):23079-23087 (2010).
Magden et al., "Transmissive silicon photonic dichroic filters with spectrally selective waveguides," Nature Communications 9:3009 (2018), 10 pgs.
Novick et al., "Tunable and Compact SiP Quasi-Dichroic Filter with 10 dB/nm Roll-Off Across C- & L-bands," 2022, 2 pgs.
Piggott et al., "Inverse design and demonstration of a compact and broadband on-chip wavelength demultiplexer," Nature Photonics 9:374-377 (2015) 15 pgs.
Piggott et al., "Inverse design and implementation of a wavelength demultiplexing grating coupler," Scientific Reports 4:7210 (2014) 5 pgs.
Rizzo et al., "Integrated Kerr frequency comb-driven silicon photonic transmitter," ar Xiv 2021, 21 pgs.
Rizzo et al., "Petabit-Scale Silicon Photonic Interconnects With Integrated Kerr Frequency Combs," IEEE J Sel Top Quantum Electron. 29:3700120 (2023), 20 pgs.
Su et al., "Inverse Design and Demonstration of a Compact on-Chip Narrowband Three-Channel Wavelength Demultiplexer," ACS Photonics 5(2):301-305 (2017).
Wang et al., "Integrated, Compact, and Tunable Band-Interleaving of a Kerr Comb Source," 2023, 2 pgs.

* cited by examiner

SILICON PHOTONIC BAND INTERLEAVER

CROSS-REFERENCE TO RELATED APPLICATION

This application claims priority to U.S. Provisional Patent Application Ser. No. 63/456,646, filed Apr. 3, 2023, which is hereby incorporated by reference herein in its entirety.

GRANT INFORMATION

This invention was made with government support under HR0011-19-2-0014 awarded by the Defense Advanced Research Projects Agency, and DE AR0000843 awarded by the U.S. Department of Energy. The government has certain rights in the invention.

BACKGROUND

As certain performance computing systems and data centers can require increased data throughput, silicon photonics (SiPh) can be used to alleviate the physical layer bandwidth bottleneck. Dense wavelength-division multiplexing (DWDM) technology can be used to link architectures, enabling ultra-high bandwidth densities and ultra-low energy-per-bit. Certain microresonator-based Kerr frequency combs can further enhance such DWDM applications by providing optical carriers with a single integrated source, which can then be individually modulated and dropped via SiPh microresonators cascaded along bus waveguides. Although microresonators can increase the bandwidth capacity of the single bus architecture, the microresonator-based modulator size can be practically limited by both the foundry process limitations and the requirement for placing radio frequency (RF) modulation and thermal tuning structures inside the modulator. In addition, the device insertion loss (IL), as well as design and fabrication complexities, can be inversely proportional to the radius, potentially reducing device performance and yield in the pursuit of a larger free spectral range (FSR).

Band-interleaving can be used to overcome the FSR limit. As opposed to even-odd interleaving, in which every other line is routed alternately to a different path, band-interleaving can partition the entire optical bands into large groups of adjacent comb lines prior to traversing the cascaded microresonators. Although Mach-Zehnder interferometers (MZIs) can perform as band interleavers, the edge roll-off needs to be sharp to mitigate crosstalk near band transition.

As such, there is a need in the art for a compact and tunable band interleaver.

SUMMARY

The disclosed subject matter provides techniques for band-interleaving. An example device can include a tunable band interleaver based on a ring-assisted Mach-Zehnder interferometer (RAMZI). The RAMZI can include a predetermined number of assist rings.

In certain embodiments, the disclosed device can have one input port and two output ports through which an optical signal travels, wherein the device has an adjustable cut-off wavelength. The device can further comprise a first multi-mode interference coupler and a second multi-mode interference coupler, wherein the first multi-mode interference coupler is connected to the input port and the second multi-mode interference coupler is connected to the output ports. The device can further comprise a first thermo-optic (TO) tuned RAMZI arm and a second thermo-optic tuned RAMZI arm, wherein the first and second RAMZI arms are coupled to and situated between the first multi-mode interference coupler and the second multi-mode interference coupler. The device can further comprise a first assist ring coupled to the first RAMZI arm and a second assist ring coupled to the second RAMZI arm. Further, the first multi-mode interference coupler can have one coupler input port and two coupler output ports, such that the first multi-mode interference coupler acts as a beam splitter for the optical signal, wherein the optical signal outputted from the first multi-mode interference coupler is split and travels along the first and second RAMZI arms. Further, the second multi-mode interference coupler can have two coupler input ports and two coupler output ports, such that the optical signal traveling along the first and second RAMZI arms is inputted into the coupler input ports and outputted from coupler output ports, wherein the optical signal outputted from the second multi-mode interference coupler travels to the output ports of the device.

In certain embodiments, the disclosed device can have a roll-off of about 63.6 dB/nm. In non-limiting embodiments, the disclosed device can include a total functional bandwidth that can span over about 36 nm, allowing for at least about 11 comb lines per band with about 200 GHz channel spacing in the C-band. In non-limiting embodiments, the total functional bandwidth can be a single RAMZI period.

In certain embodiments, the disclosed device can include a quasi-dichroic filter. In non-limiting embodiments, the quasi-dichroic filter can have a functional dichroic bandwidth covering full C- & L-bands.

In certain embodiments, a predetermined parameter of the disclosed device can be tuned through thermal tuning. In non-limiting embodiments, the predetermined parameter can include a cutoff wavelength.

Figure 1A:
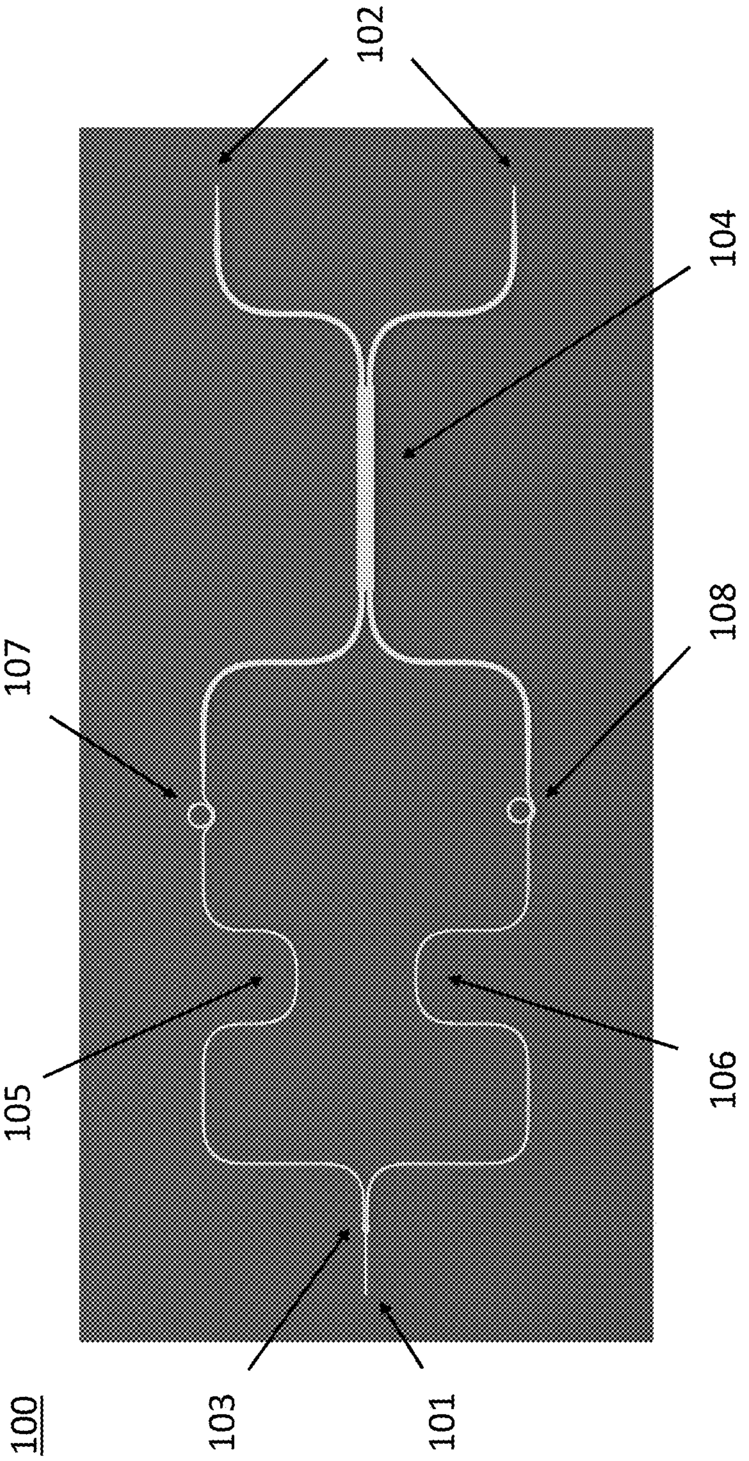
FIG. 1A provides a microscopic annotated image showing an example band-interleaver device in accordance with the disclosed subject matter.

It is to be understood that both the foregoing general description and the following detailed description are exemplary and are intended to provide further explanation of the disclosed subject matter

DETAILED DESCRIPTION

The presently disclosed subject matter provides techniques for band-interleaving. The disclosed techniques provide systems and methods for band-interleaving of a Kerr comb.

Unless otherwise defined, all technical and scientific terms used herein have the same meaning as commonly understood by one of ordinary skill in the art. In case of conflict, the present document, including definitions, will control. Certain methods and materials are described below, although methods and materials similar or equivalent to those described herein can be used in the practice or testing of the presently disclosed subject matter. The materials, methods, and examples disclosed herein are illustrative only and not intended to be limiting.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, up to 10%, up to 5%, and up to 1% of a given value.

The term "coupled," as used herein, refers to the connection of a device component to another device component by methods known in the art. The type of coupling used to connect two or more device components can depend on the scale and operability of the device.

In certain embodiments, the disclosed subject matter provides an integrated silicon photonic (SiPh) device based on a ring-assisted Mach-Zehnder interferometer (RAMZI). The disclosed device can perform interleaving bands of the optical spectrum to multiplex or demultiplex portions of spectral content to or from a single physical optical channel to or from 2 or more separate physical optical channels. In non-limiting embodiments, the device can be tunable utilizing the thermo-optic (TO) and/or electro-optic effect to align and shift the predetermined locations of the pass and stop bands.

In certain embodiments, the disclosed subject matter provides a compact and tunable band interleaver. For example, the disclosed interleaver can be a compact and tunable band interleaver based on a dual-ring RAMZI. In non-limiting embodiments, the disclosed interleaver can have a sharp roll-off (e.g., of 63.6 dB/nm). The total functional bandwidth, defined as a single RAMZI period, can span over about 36 nm, allowing for about 11 comb lines per band with 200 GHz channel spacing in the C-band.

In certain embodiments, the disclosed subject matter provides techniques for thermal tuning of the cutoff wavelength and band interleaving of the Kerr frequency comb. The disclosed techniques can be used to increase link bandwidth density. The disclosed device can include a dichroic filter across the full C-band, with roll-off sharp enough to split the spectrum between two adjacent optical carriers allowing for full spectral utilization.

FIG. 1A shows an example integrated silicon photonic band interleaver device 100. The device 100 has one input port 101 and two output ports 102 through which an optical signal travels. Further, the device 100 has an adjustable cut-off wavelength. The device can include at least two 3 dB multi-mode interference (MMI) couplers, wherein each 3 dB MMI coupler has a power coupling ratio of 3 dB. For example, the device can include a first MMI coupler 103 and a second MMI coupler 104, wherein the first MMI coupler 103 is connected to the input port 101 of the device 100, and the second MMI coupler 104 is connected to the output ports 102 of the device 100.

The device 100 can further comprise at least a first thermo-optic tuned RAMZI arm 105 and a second thermo-optic tuned RAMZI arm 106, wherein the first and second RAMZI arms 105, 106 are coupled to and situated between the first MMI coupler 103 and a second MMI coupler 104.

The device 100 can further comprise a first assist ring 107 coupled to the first RAMZI arm 105 and a second assist ring 108 coupled to the second RAMZI arm 106.

The first MMI coupler 103 has one coupler input port and two coupler output ports, such that the first MMI coupler 103 acts as a beam splitter for the optical signal, such that the optical signal outputted from the first MMI coupler 103 is split and travels along the first and second RAMZI arms 105, 106.

The second MMI coupler 104 has two coupler input ports and two coupler output ports, such that the optical signal traveling along the first and second RAMZI arms 105, 106 is inputted into the coupler input ports and outputted from the coupler output ports, such that the optical signal outputted from the second MMI coupler 104 travels to the output ports 102 of the device 100.

The optimal power coupling to the first assist ring 107 and the second assist ring 108 for sharp roll-off and flat bands can be about 0.9 and about 0.44, respectively. The assist rings' effective path length, Lr, can be about twice the MZI arm length difference, ΔL. More precisely, the length relation is $\beta Lr=2\beta\Delta L\pm\pi$, where β is the propagating mode's phase constant. In non-limiting embodiments, free spectral range (FSR) of a RAMZI can determine the total bandwidth, which can be equal to $2c/n_gL_r$ in frequency, where c is the speed of light and $n_g$ is the group index of the constituent waveguide.

In certain embodiments, to maximize the functional bandwidth, a racetrack-style assist ring is avoided, as the coupling length contributes to the resonator path length. The disclosed subject matter provides radial assist rings with wrap-around style bent directional couplers (BDCs). For example, the radius of assist rings can be about 5 microns, matching the RAMZI FSR (e.g., of 36 nm). Doped silicon heaters can be placed in the center of the rings, which enables TO compensation of fabrication variations as well as adjustment of the cutoff wavelength.

In certain embodiments, a tunable laser can be swept (e.g., from 1520-1560 nm) at a 10 pm resolution to characterize the transmission spectrum of the band interleaver (see FIG.

1B). FIG. 1B shows the normalized transmission spectra of two output ports 102 of the RAMZI band interleaver. The passband 3 dB bandwidth can be about 18 nm corresponding to a 36 nm functional bandwidth, and the crosstalk can be measured to be improved (e.g., better than 14 dB). The roll-off can be as sharp as 63.6 dB/nm, measured from 3 dB point to 10 dB point. Such a sharp roll-off can reduce the insertion loss and crosstalk near the band transition.

Figure 1C:
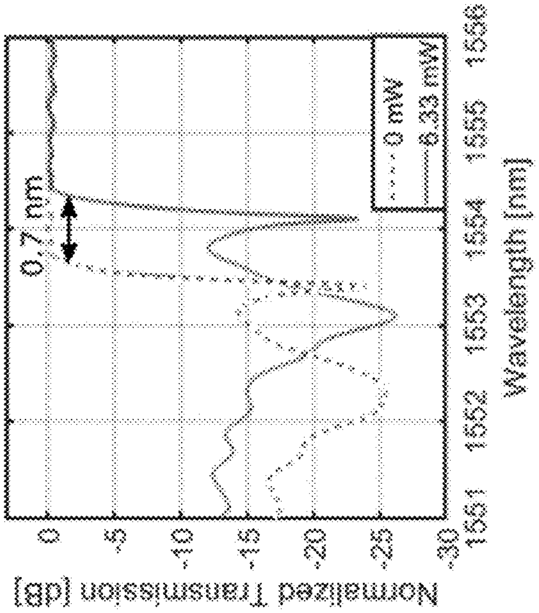
FIG. 1C shows a graph illustrating an example of thermal tuning of the cutoff wavelength in accordance with the disclosed subject matter.
Figure 1B:
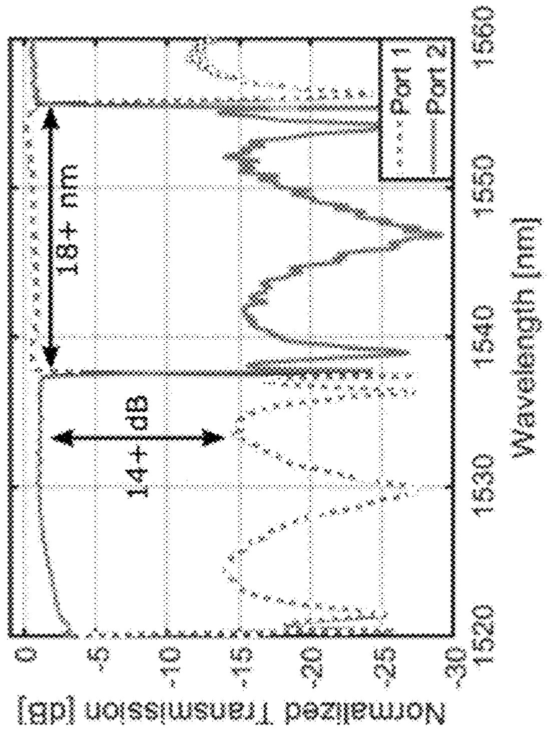
FIG. 1B shows a graph illustrating normalized transmission spectra in accordance with the disclosed subject matter.

FIG. 1C shows the thermal tuning of the cutoff wavelength, with an efficiency of about 0.11 nm/mW. The thermal efficiency can be further improved by altering heater designs and device thermal isolation via the undercut technique.

Figure 2A:
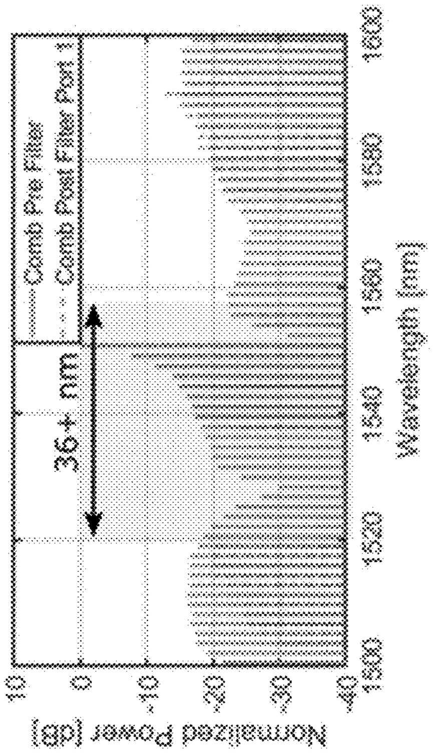
FIG. 2A provides a graph showing a measured normalized 200 GHz Kerr comb spectrum before and after filtering in accordance with the disclosed subject matter.
Figure 2B:
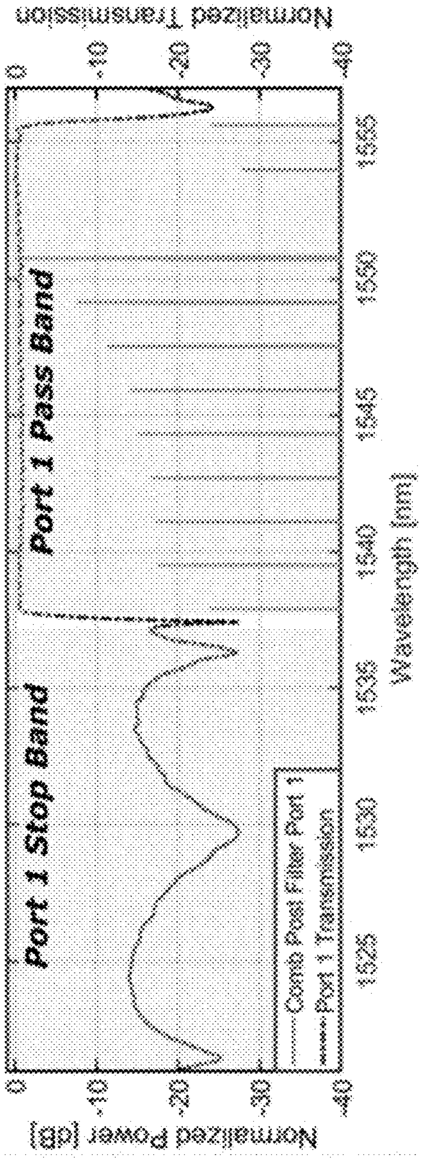
FIG. 2B provides a graph showing zoomed spectra illustrating the effectiveness of sharp roll-off and spectral splitting between adjacent lines.

To demonstrate the efficacy of the device, a dual-ring Kerr comb with 200 GHz channel spacing can be used as the input source, and band interleaving is shown in FIGS. 2A and 2B. The pass band and stop band each can accommodate 11 comb lines. FIG. 2A provides a graph showing a measured normalized 200 GHz Kerr comb spectrum before and after filtering in accordance with the disclosed subject matter. FIG. 2B provides a graph showing zoomed spectra illustrating the effectiveness of sharp roll-off and spectral splitting between adjacent lines.

In certain embodiments, the disclosed band interleaver based on RAMZI can perform the band interleaving of the Kerr frequency comb. For example, the disclosed device can provide a sharp roll-off (e.g., of 63.6 dB/nm) with a total functional bandwidth of 36 nm. The bandwidth can be further improved by altering ring designs with reduced radii. The disclosed device and methods can be used to scale SiPh-based DWDM link architectures toward increased bandwidth capacity.

In certain embodiments, the disclosed system can include a filter that can affect the number of wavelength division multiplexing ($N_{chans}$). The number of WDM can be determined by the total optical bandwidth utilized by a link ($\Delta\lambda_{chan}$) divided by the optical channel spacing ($\Delta\lambda_{chan}$). In non-limiting embodiments, a data rate per channel can be calculated based on crosstalk penalties between channels. For example, the lowest data rate per channel can be calculated based on minimizing the crosstalk penalty between channels, which is dependent on the data rate and the resonant filters' quality factor (Q). The maximum link can be limited by the smallest device-free spectral range (FSR) present in the architecture.

In certain embodiments, the disclosed device can include a filter that can allow the spectrum to be split at a predetermined cutoff wavelength. For example, the disclosed system can include a RAMZI-based compact and loss quasi-dichroic filter, with functional dichroic bandwidth covering nearly the full C- & L-bands. The disclosed device can allow for thermal tuning to compensate for fabrication variations and fine-tune device performance, such as split of spectrum and post-fabrication.

In certain embodiments, the disclosed system can include a RAMZI model. The disclosed model can calculate transmission spectra for each RAMZI output using the following equations:

$$L_r = 2\pi r_{ring},\ \ \Delta L = \frac{L_r}{2} + \frac{\lambda_c}{4n_g},\ \ \beta = \frac{2\pi n_g}{\lambda} \tag{1}$$

$$A_d = 10^{-\frac{ad}{10}},\ \ B_i = \sqrt{1-k_i},\ \ C_i = \frac{B_i - A_{L_r}e^{j\beta L_r}}{1 - A_{L_r}B_i e^{j\beta L_r}}$$

$$E_{odd} = A_L e^{j\beta L} C_1 C_3,\ \ E_{even} = A_L e^{j\beta L} A_{\Delta L} e^{j\beta \Delta L} C_2$$

Figure 3A:
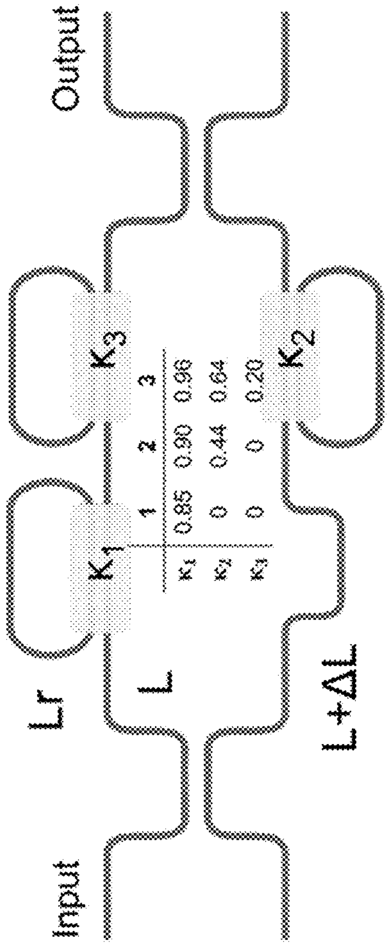
FIG. 3A provides a diagram showing an example analytical model for 3 basic ring-assisted Mach-Zehnder interferometer (RAMZI) configurations with assist rings in accordance with the disclosed subject matter.
Figure 3B:
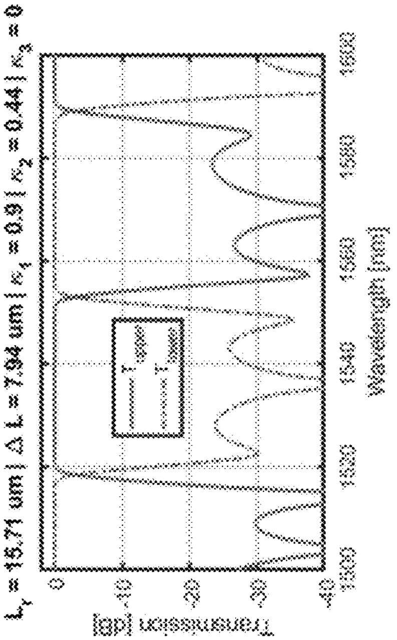
FIG. 3B provides a graph showing the output spectra of the 2-ring configuration RAMZI in accordance with the disclosed subject matter.

-continued $$E_{upper} = \frac{1}{2}(E_{odd} - E_{even}),\ \ E_{lower} = \frac{j}{2}(E_{odd} + E_{even})$$

$$T_{upper} = |E_{upper}|^2,\ \ T_{lower} = |E_{lower}|^2$$

Where $r_{ring}$ is the radius of the assist rings, $n_g$ is the group index of the propagating optical mode, $\lambda_c$ is the center wavelength of $\Delta\lambda_{link}$, L is the length of the shorter RAMZI arm (coupled to odd-numbered rings), ΔL is the path length difference between the two RAMZI arms, α is the propagation loss in dB/m, $E_{odd}$ and $E_{even}$ are the respective electric fields of the shorter and longer RAMZI arms, and $T_{upper}$ and $T_{lower}$ are the respective transmission spectra of the upper and lower RAMZI outputs, as shown in FIG. 3A. An example set of transmission spectra derived from the equations above is shown in FIG. 3B. FIG. 3A shows the model for three exemplary RAMZI configurations, including 1, 2, and 3 assist rings. For each case, κi is the optical power coupling coefficient into each ring from the respective RAMZI arm, optimizing for flatness in the passband. FIG. 3B shows a modeled output spectra of 2-ring configuration RAMZI with $r_{ring}$=2.5 μm and $n_g$=4.35. The band suppression ratio is about 20+ dB, and the functional dichroic bandwidth is about 70+ nm. Filter roll-off, measured from the 3 dB point to 20 dB, is about 7.8 dB/nm.

In certain embodiments, the RAMZI assist rings can operate in the over-coupled regime (e.g., κ1≥0.85) and can be in the racetrack style configuration, with either long straight directional couplers (DCs) or asymmetric 2×2 MMIs coupling between the MZI arms and respective rings. To maximize the functional dichroic bandwidth, a racetrack-style ring can be avoided, as the increased coupling length contributes to resonator path length, decreasing the FSR. Instead, radial rings with wrap-around style κ-matched bent directional couplers (BDCs) can be used to achieve the requisite coupling strength, while also taking advantage of the improved broadband performance of BDCs relative to symmetric DCs. While using a BDC to extend the physical coupling length can achieve the requisite coupling over the necessary bandwidth, there can be a trade-off in device performance and FSR due to increasing bend loss in the assist ring as the radius of curvature decreases.

Figure 4B:
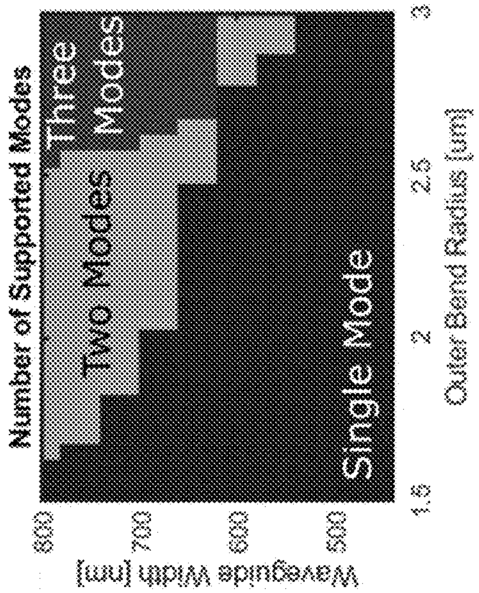
FIG. 4B provides a graph showing that bends can change the single-mode cut-off condition in accordance with the disclosed subject matter.
Figure 4A:
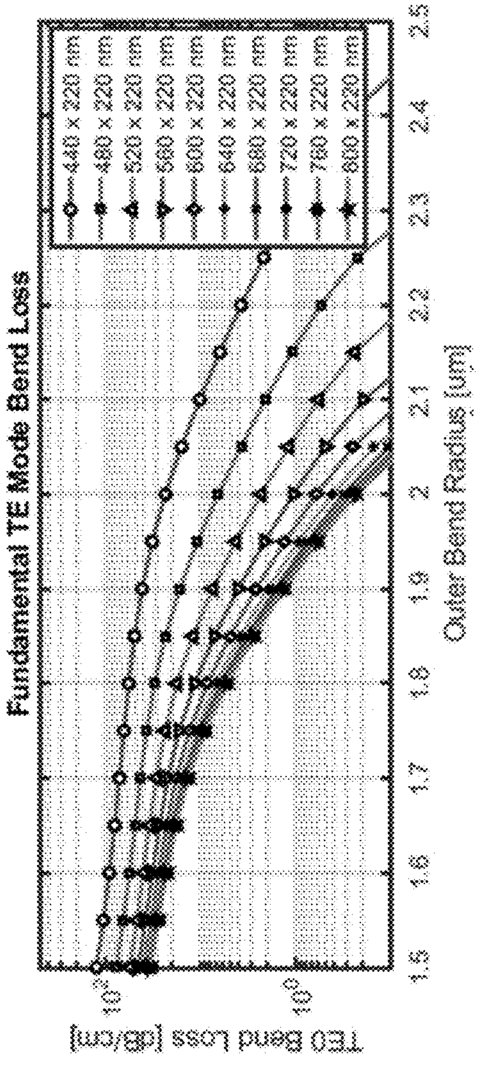
FIG. 4A provides a graph showing results from a Finite Difference Eigenmode (FDE) solver for a bent SOI slab waveguide with a 200 nm height varying the waveguide width and bend radius.

FIG. 4 shows results from a Finite Difference Eigenmode (FDE) solver for a bent SOI slab waveguide with a 220 nm height, varying the waveguide width and bend radius (defined from the bend radial origin to the outer waveguide edge). FIG. 4A shows that $TE_0$ bend loss can increase with reduced radius and reduce with increased width due to higher mode confinement. FIG. 4B shows that tight bends can change the single-mode cut-off condition, for rbend=2.5 tm waveguides as wide as 620 nm remain single-mode. As shown in FIG. 4, FDE simulations show that for the fundamental TE mode ($TE_0$) of a 220 nm tall silicon-on-insulator (SOI) slab waveguide, bend loss increases with reduced bend radius but also decreases as the waveguide gets wider (FIG. 4A). Under non-bent conditions, increasing the waveguide width past 500 nm can result in supporting multiple modes, risking parasitic inter-mode coupling that degrades performance. As shown in FIG. 4B, tight bends alter the waveguide's single-mode cut-off conditions, and a deeply multi-mode straight waveguide can only support a single-guided mode if bent tightly enough.

Figure 5A:
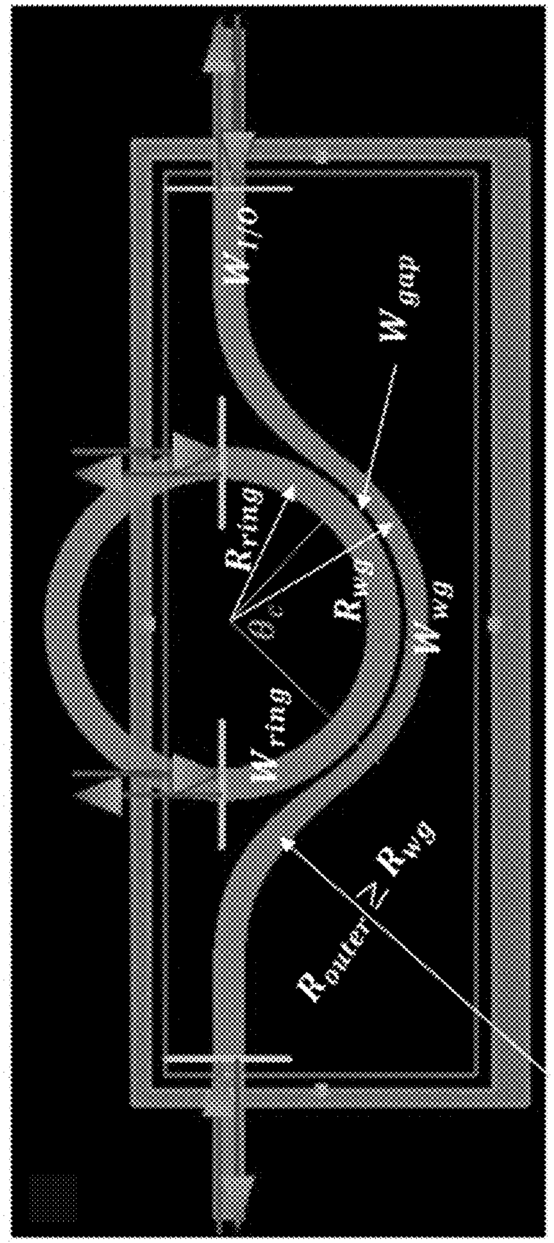
FIG. 5A provides a diagram showing an example geometrical parameterization in the disclosed Finite Difference Time Domain (FDTD) solver for a ring resonator.
Figure 5B:
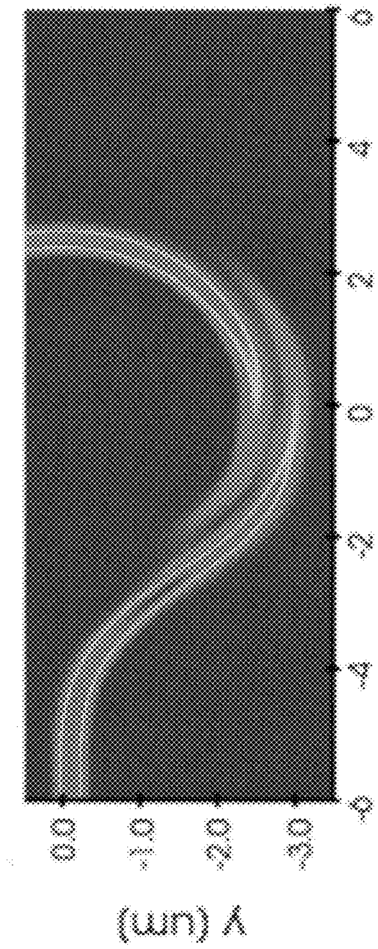
FIG. 5B provides a diagram showing the propagation of light through the disclosed geometry.
Figure 5C:
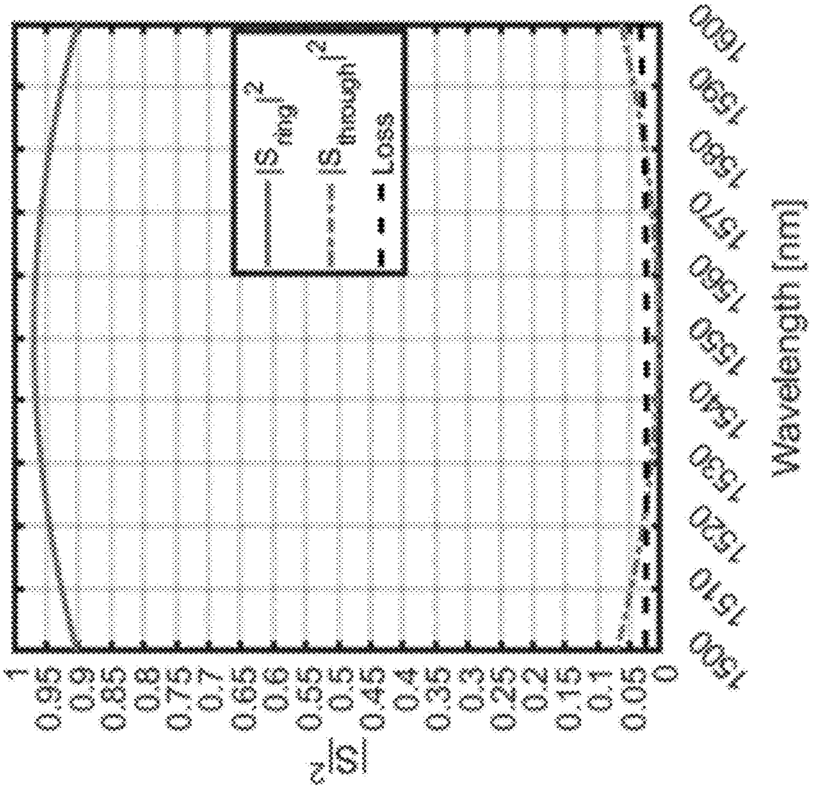
FIG. 5C provides a graph showing the wavelength-dependent power coupling into the disclosed ring in accordance with the disclosed subject matter.

In certain embodiments, the disclosed system can include optimization algorithms in combination with a 3D Finite Difference Time Domain (FDTD) solver to find geometrical configurations that achieve each of the 6 different nominal coupling targets defined in FIG. 3A. FIG. 5A shows the geometrical parameterization in the FDTD solver for a ring resonator with a wrap-around κ-matched BDC. FIG. 5A shows the FDTD geometry for the κ1=0.96 case. FIG. 5B shows the propagation of light through the geometry when $TE_0$ is launched from the left port at λ=1550 nm. FIG. 5C plots the wavelength-dependent power coupling into the ring, leftover power in the waveguide, and excess loss. FIG. 5C shows the $|S|^2$ as a function of wavelength optimizing for κ=0.96.

Figure 6A:
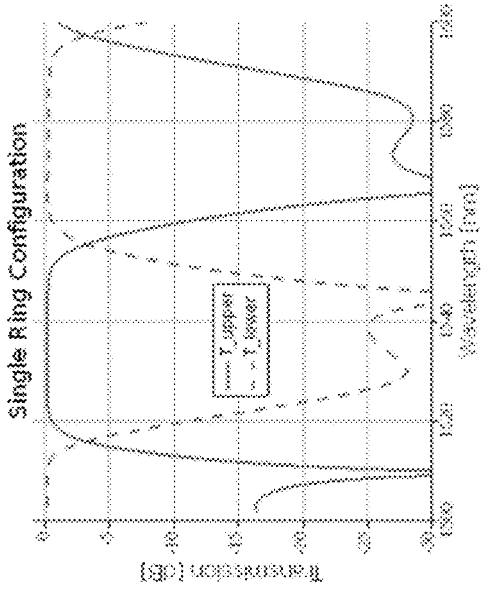
FIG. 6A provides a graph showing the performance of the disclosed device with one assist ring.
Figure 6B:
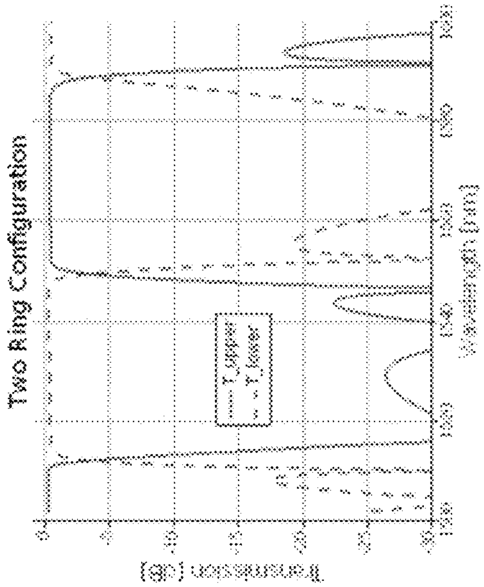
FIG. 6B provides a graph showing the performance of the disclosed device with two assist rings.
Figure 6C:
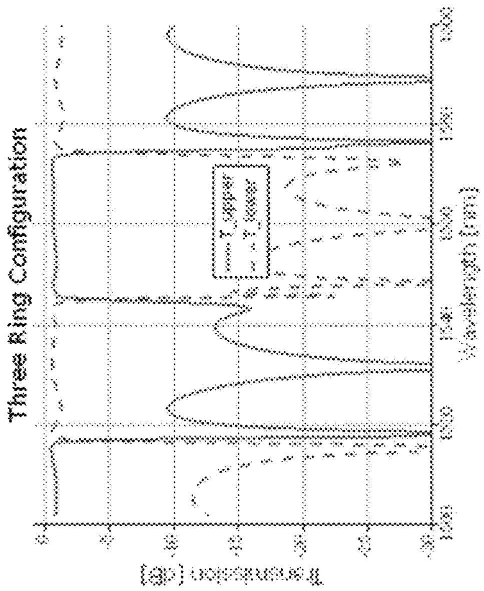
FIG. 6C provides a graph showing the performance of the disclosed device with three assist ring.

FIG. 6 shows that the S-parameters solved in FDTD for each ring can be exported into a simulation software (e.g., Lumerical INTERCONNECT) to validate the overall device performance of each configuration. The simulated functional dichroic bandwidth can exceed 70 nm and reach up to 10 dB/nm roll-off at λco. For example, FIG. 6 shows the simulated device performance for several different RAMZI-based quasi-dichroic filters. In all cases, passband insertion loss can be less than 1 dB. FIG. 6A shows an example performance of the disclosed device with the one assist ring, functional dichroic bandwidth is 80+ nm with a roll-off of 2.5 dB/nm at λco. FIG. 6B shows an example performance of the disclosed device with two assist rings, functional dichroic bandwidth is 75+ nm with a roll-off of 8.5 dB/nm at λco. FIG. 6C shows an example performance of the disclosed device with three assist rings, functional dichroic bandwidth is 55+ nm with a roll-off of 10 dB/nm at λco.

In terms of roll-off, insertion loss, crosstalk and footprint, for a finite $\Delta\lambda_{link}$, RAMZI-based integrated quasi-dichroic filters show improved performance relative to true-dichroic filters. While the functional-dichroic bandwidth of this RAMZI-based filter can be fundamentally limited by the ring FSR, simulations clearly demonstrate the feasibility of the disclosed techniques and systems supporting DWDM architectures with $\Delta\lambda_{link}$ exceeding 70 nm. The disclosed RAMZI-based filter can also be more compact, has sharper roll-offs, and can be less susceptible to small variations in splitting ratios than equivalent MZI-lattice filters. Furthermore, the freely tunable λco allows for flexible reconfigurability depending on the application.

While it will become apparent that the subject matter herein described is well calculated to achieve the benefits and advantages set forth above, the presently disclosed subject matter is not to be limited in scope by the specific embodiments described herein. It will be appreciated that the disclosed subject matter is susceptible to modification, variation, and change without departing from the spirit thereof. Those skilled in the art will recognize or be able to ascertain, using no more than routine experimentation, many equivalents to the specific embodiments described herein. Such equivalents are intended to be encompassed by the following claims.

The invention claimed is:

1. An integrated silicon photonic band interleaver device having one input port and two output ports through which an optical signal travels, wherein the device has an adjustable cut-off wavelength, the device comprising:

a first multi-mode interference coupler and a second multi-mode interference coupler, wherein the first multi-mode interference coupler is connected to the input port and the second multi-mode interference coupler is connected to the output ports;

a first thermo-optic tuned ring-assisted Mach Zehnder interferometer (RAMZI) arm and a second thermo-optic tuned RAMZI arm, wherein the first and second RAMZI arms are coupled to and situated between the first multi-mode interference coupler and the second multi-mode interference coupler;

a first assist ring coupled to the first RAMZI arm and a second assist ring coupled to the second RAMZI arm;

wherein the first multi-mode interference coupler has one coupler input port and two coupler output ports, such that the first multi-mode interference coupler acts as a beam splitter for the optical signal, wherein the optical signal outputted from the first multi-mode interference coupler is split and travels along the first and second RAMZI arms;

wherein the second multi-mode interference coupler has two coupler input ports and two coupler output ports, such that the optical signal traveling along the first and second RAMZI arms is inputted into the coupler input ports and outputted from the coupler output ports, wherein the optical signal outputted from the second multi-mode interference coupler travels to the output ports of the device;

wherein at least one of the first assist ring and the second assist ring includes a doped silicon heater positioned in a center of the ring, wherein the doped silicon heater is configured to provide thermo-optic compensation of fabrication variations and adjustment of the cut-off wavelength.

2. The device of claim 1, wherein the first multi-mode interference coupler and second multi-mode interference coupler each have a power coupling ratio of 3 dB.

3. The device of claim 1, wherein the first multi-mode interference coupler and second multi-mode interference coupler each are bent directional couplers.

4. The device of claim 1, wherein the first assist ring and second assist ring each have an effective path length Lr.

5. The device of claim 4, wherein the effective path length $L_r$ of the first assist ring and second assist ring equals approximately twice a difference in length between the RAMZI arms.

6. The device of claim 4, having a free spectral range equaling to $2c/n_gL_r$ in frequency, wherein c is the speed of light and $n_g$ is the group index of a constituent waveguide.

7. The device of claim 1, wherein the first assist ring and second assist ring each are radial rings.

8. The device of claim 1, wherein the first assist ring and second assist ring each have a radius of 5 microns.

9. The device of claim 1, wherein the first assist ring and second assist ring each include a power coupling adapted to provide sharp roll-offs and flat bands.

10. The device of claim 9, wherein the power coupling to the first assist ring is 0.9.

11. The device of claim 9, wherein the power coupling to the second assist ring is 0.44.

12. A method for interleaving an optical signal using an integrated silicon photonic band interleaver device having one input port and two output ports through which the optical signal travels, wherein the device has an adjustable cut-off wavelength, the method comprising:

transmitting the optical signal through the input port of the device, wherein the inputted optical signal will travel through a first multi-mode interference coupler connected to the input port;

outputting, from the first multi-mode interference coupler, the optical signal, wherein the first multi-mode interference coupler includes one coupler input port and two coupler output ports, such that the first multi-mode interference coupler acts as a beam splitter for the optical signal, wherein the split signal outputted from the first multi-mode interference coupler travels along a first thermo-optic tuned ring-assisted Mach Zehnder interferometer (RAMZI) arm and a second thermo-optic tuned RAMZI arm;

wherein a first assist ring is coupled to the first RAMZI arm and a second assist ring is coupled to the second RAMZI arm;

wherein the second multi-mode interference coupler has two coupler input ports and two coupler output ports, such that the split optical signal traveling along the first and second RAMZI arms is inputted into the coupler input ports and outputted from the coupler output ports, wherein the optical signal outputted from the second multi-mode interference coupler travels to the output ports of the device;

wherein at least one of the first assist ring and the second assist ring includes a doped silicon heater positioned in a center of the ring, wherein the doped silicon heater is configured to provide thermo-optic compensation of fabrication variations and adjustment of the cut-off wavelength.

13. The method of claim 12, wherein the first multi-mode interference coupler and second multi-mode interference coupler each have a power coupling ratio of 3 dB.

14. The method of claim 12, wherein the first multi-mode interference coupler and second multi-mode interference coupler each are bent directional couplers.

15. The method of claim 12, wherein the first assist ring and second assist ring each have an effective path length $L_r$.

16. The method of claim 15, wherein the effective path length $L_r$ of the first assist ring and second assist ring equals approximately twice the difference in length between the RAMZI arms.

17. The method of claim 15, having a free spectral range equaling to $2c/n_gL_r$ in frequency, wherein c is the speed of light and $n_g$ is the group index of a constituent waveguide.

18. The method of claim 12, wherein the first assist ring and second assist ring each are radial rings.

19. The method of claim 12, wherein the first assist ring and second assist ring each have a radius of 5 microns.

20. The method of claim 12, wherein the first assist ring and second assist ring each include a power coupling adapted to provide sharp roll-offs and flat bands.

21. The method of claim 20, wherein the power coupling to the first assist ring is 0.9.

22. The method of claim 20, wherein the power coupling to the second assist ring is 0.44.

* * * * *